United States Patent
Chevalier et al.

(10) Patent No.: US 7,425,351 B2
(45) Date of Patent: Sep. 16, 2008

(54) SILICONE RESINS

(75) Inventors: Pierre Maurice Chevalier, Penarth (GB); Steven Robson, Cardiff (GB); Anne Dupont, Nivelles (BE); Duan Li Ou, Framingham, MA (US); Yeong Joo Lee, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 574 days.

(21) Appl. No.: 10/531,163

(22) PCT Filed: Oct. 9, 2003

(86) PCT No.: PCT/EP03/11511

§ 371 (c)(1),
(2), (4) Date: Apr. 12, 2005

(87) PCT Pub. No.: WO2004/035661

PCT Pub. Date: Apr. 29, 2004

(65) Prior Publication Data

US 2006/0057297 A1 Mar. 16, 2006

(30) Foreign Application Priority Data

Oct. 16, 2002 (GB) .................................. 0224044.8

(51) Int. Cl.
*B05D 3/02* (2006.01)

(52) U.S. Cl. .................. 427/379; 427/387; 528/21; 528/31; 528/32

(58) Field of Classification Search ................ 427/379, 427/387; 528/21, 31, 32
See application file for complete search history.

(56) References Cited

U.S. PATENT DOCUMENTS

| | | | | |
|---|---|---|---|---|
| 5,116,637 A | * | 5/1992 | Baney et al. ................ 427/340 |
| 5,446,087 A | | 8/1995 | Chizat et al. ................ 524/588 |
| 5,468,828 A | | 11/1995 | Hurford et al. .............. 528/15 |
| 5,777,047 A | | 7/1998 | Chung et al. ................ 525/478 |
| 5,977,226 A | * | 11/1999 | Dent et al. .................. 524/267 |
| 6,124,407 A | | 9/2000 | Lee et al. .................... 525/478 |
| 2002/0142174 A1 | | 10/2002 | Kropp et al. ................ 428/447 |

FOREIGN PATENT DOCUMENTS

WO    WO 02/081552    10/2002

* cited by examiner

*Primary Examiner*—Erma Cameron
(74) *Attorney, Agent, or Firm*—Patricia M. Scaduto

(57) ABSTRACT

A silicone resin, curable to a resin of low coefficient of thermal expansion, high glass transition temperature and high modulus, has the empirical formula $$(R_3SiO_{1/2})_a(R_2SiO_{2/2})_b(RSiO_{3/2})_c(SiO_{4/2})_d$$

wherein each R is a hydrocarbon or substituted hydrocarbon group or a hydrogen atom; and a=0.02 to 0.8; b=0 to 0.4; and c+d=0.2 to 0.98, where a+b+c+d=1.0, characterized in that at least 2 mole % of the siloxane units in the resin are of the formula $R'SiO_{1/2}$, $RR'_2SiO_{1/2}$ or $R'_2SiO_{2/2}$, wherein each R' is an alkenyl group.

22 Claims, No Drawings

SILICONE RESINS

CROSS REFERENCE TO RELATED APPLICATIONS

This application is a U.S. national stage filing under 35 U.S.C. §371 of PCT Application No. PCT/EP03/11511 filed 9 Oct. 2003, currently pending, which claims the benefit of Great Britain Patent Application No. 0224044.8 filed 16 Oct. 2002 under 35 U.S.C. §119 (a)-(d) and 35 U.S.C. §365(a). PCT Application No. PCT/EP03/11511 and Great Britain Patent Application No. 0224044.8 are hereby incorporated by reference.

This invention relates to silicone resins curable by addition polymerisation and/or hydrosilylation, to methods of preparation of the curable resins, and also to processes for curing the resins and to cured resins produced thereby.

BACKGROUND TO THE INVENTION

There is an increasing need for resins with good dimensional stability (low coefficient of thermal expansion (CTE), high glass transition temperature Tg and high modulus) and moisture and heat resistance over a wide temperature range. There is a particular need for resins which can be applied in a curable state and which can be cured in a thick section and are thus suitable for encapsulating delicate substrates, for example as underfill for microelectronic device packaging, as matrix resin in composites, and also in coatings such as wafer level and solar panel coatings, in planarization layers for Flat Panel Displays and in photonic devices.

Silicone resins have excellent heat resistance and are moisture repellent but typically have a CTE in the range 110 to 350 ppm/° C., compared to 50 to 120 ppm/° C. for most organic polymers and resins. The present invention seeks to produce silicone resins having reduce CTE in the cured state so that they are more suitable for the uses listed above U.S. Pat. No. 6,124,407 describes a silicone composition comprising (A) 100 parts by weight of a polydiorganosiloxane containing an average of at least two silicon-bonded alkenyl groups per molecule; (B) 75 to 150 parts by weight of an organopolysiloxane resin containing an average of from 2.5 to 7.5 mole percent of alkenyl groups; (C) an organohydrogenpolysiloxane having an average of at least three silicon-bonded hydrogen atoms per molecule in an amount to provide from one to three silicon-bonded hydrogen atoms per alkenyl group in components (A) and (B) combined; (D) an adhesion promoter in an amount to effect adhesion of the composition to a substrate; and (E) a hydrosilylation catalyst in an amount to cure the composition. The composition is useful as an encapsulant in chip scale packages.

Siloxane resins containing at least two alkenyl groups, present for example as dimethylvinylsilyl units, are described in U.S. Pat. No. 5,777,047 and U.S. Pat. No. 5,468,828. These siloxane resins are used in minor amounts to cure a polydiorganosilane to an elastomer, rather than to form a rigid thermoset resin.

DESCRIPTION OF THE INVENTION

According to one aspect of the present invention, a curable silicone resin has the empirical formula

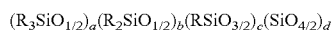

wherein each R is a hydrocarbon or substituted hydrocarbon group or a hydrogen atom; and a=0.02 to 0.8; b=0 to 0.4; and c+d=0.2 to 0.98, where a+b+c+d=1.0, characterized in that at least 2 mole % of the siloxane units in the resin are of the formula $R'_3SiO_{1/2}$, $RR'_2SiO_{1/2}$ or $R'_2SiO_{2/2}$, wherein each R' is an alkenyl group.

The invention also includes a process for the preparation of a cured heat resistant silicone resin having a low coefficient of thermal expansion, characterised in that a curable silicone resin as described above is reacted with a curing agent having at least one functional group reactive with the alkenyl group R'. The cured resin containing branching derived from $R'_3SiO_{1/2}$ or $RR_2SiO_{1/2}$ or $R'_2SiO_{2/2}$ siloxane units has low CTE, high Tg and modulus and high thermal stability, and increased mechanical strength compared to a resin having a high proportion of $SiO_{4/2}$ units.

The groups R' in the siloxane units $R'_3SiO_{1/2}$ or $RR'_2SiO_{1/2}$ or $R'_2SiO_{2/2}$ are generally alkenyl groups having 2 to 8 carbon atoms, and are preferably vinyl groups although allyl or hexenyl groups are alternatives. Preferably at least 10 mole %, more preferably at least 15 mole %, of the siloxane units of the curable silicone resin are $R'_3SiO_{1/2}$ or $RR'_2SiO_{1/2}$ or $R'_2SiO_{2/2}$ groups, most preferably $R'_3SiO_{1/2}$ groups such as $Vi_3SiO_{1/2}$ groups, where Vi represents vinyl.

The groups R in the siloxane units $RR'_2SiO_{1/2}$ are most preferably methyl groups but can be other alkyl groups having up to 4 carbon atoms, for example ethyl groups, or aryl groups, particularly phenyl. The siloxane units $RR'_2SiO_{1/2}$ can for example be divinylmethylsiloxy or divinylphenylsiloxy units.

The groups R in the siloxane units of the formula $RSiO_{3/2}$ (T units) are selected from hydrocarbon groups, substituted hydrocarbon groups and hydrogen atoms (Si—H groups). Examples of hydrocarbon groups are alkyl groups, preferably having up to 4 carbon atoms, most preferably methyl groups, or aryl groups, particularly phenyl. Examples of substituted hydrocarbon groups are haloalkyl, alkoxyalkyl and chlorophenyl groups. The groups R in the T units can be the same or different. Preferably at least 80 mole % of the siloxane units of the resin are selected from $R'_3SiO_{1/2}$, $RSiO_{3/2}$ and $SiO_{4/2}$ units. Similar groups R can be in the $R_2SiO_{2/2}$ units (D units) if any are present, but the resin preferably contains no more than 40 mole %, more preferably less than 20 mole %, D units. The resin may optionally contain $R'R_2SiO_{1/2}$ or $R_3SiO_{1/2}$ units where each R is other than alkenyl, although for stability and safety reasons it is preferred that no more than two hydrogen atoms, most preferably no more than one hydrogen atom, are bonded to each Si atom.

In one preferred embodiment of the invention, at least 5 mol %, most preferably at least 20%, of the siloxane units of the resin are of the formula $ArSiO_{3/2}$ where Ar represents an aryl group up to 50 or even 70 mol % $ArSiO_{3/2}$ units. The aryl groups Ar in the siloxane T units of the formula $ArSiO_{3/2}$ are preferably phenyl groups, although naphthyl or tolyl groups are alternatives. The aryl groups may enhance the thermal stability of the cured silicone resin.

In one process according to the invention for the preparation of a curable silicone resin, at least one chlorosilane of the formula $R'_3SiCl$, $RR'_2SiCl$ or $R'_2SiCl_2$ is reacted with at least one chlorosilane of the formula $RSiCl_3$ and/or $SiC4$ and/or an alkoxysilane of the formula $RSi(OY)_3$ or $Si(OY)_4$ and optionally a chlorosilane of the formula $R_2SiCl_2$. For example at least one chlorosilane of the formula $R'_3SiCl$ or $RR'_2SiCl$ can be reacted with at least one chlorosilane of the formula $RSiCl_3$ or $SiCl_4$ in the presence of water and a dipolar aprotic solvent which is at least partially miscible with water, for example tetrahydrofuran (THF), dioxane or a ketone containing 4 to 7 carbon atoms such as methyl isobutyl ketone (MIBK), methyl ethyl ketone or methyl isoamyl ketone.

A curable silicone resin according to the invention can alternatively be prepared by reaction of a mixture comprising an alkoxysilane of the formula R'$_3$SiOY, RR'$_2$SiOY or R'$_2$Si(OY)$_2$ with an alkoxysilane of the formula RSi(OY)$_3$ and/or Si(OY)$_4$ where Y is an alkyl group having 1 to 6 carbon atoms, preferably methyl or ethyl, in the presence of water, a hydrolysis catalyst such as an inorganic acid or base, and preferably an organic solvent for the reaction product such as a ketone or aromatic hydrocarbon. In a further alternative process, a curable silicone resin according to the invention containing siloxane units of the formula SiO$_{4/2}$ can be prepared by dripping an alkyl silicate (tetraalkoxysilane) into a mixture of aqueous HCl of concentration at least 5% by weight and a disiloxane of the formula (R'$_3$Si)$_2$O or (RR'$_2$Si)$_2$O, or a chlorosilane of the formula R'$_3$SiCl or RR'$_2$SiCl, or an alkoxysilane of the formula R'$_3$SiOY or RR$_2$SiOY.

In another preferred process for preparing a silicone resin according to the invention containing siloxane units of the formula SiO$_{4/2}$ a silicone resin of the formula (R$_3$SiO$_{1/2}$)$_a$(R$_2$SiO$_{2/2}$)$_b$(RSiO$_{3/2}$)$_c$(SiO$_{4/2}$)$_d$ wherein each R is a hydrocarbon or substituted hydrocarbon group or a hydrogen atom; and a=0.02 to 0.8; b=0 to 0.4; and c+d=0.2 to 0.98, where a+b+c+d=1.0, at least 2 mole % of the siloxane units in the resin being of the formula R'$_3$SiO$_{1/2}$, RR'$_2$SiO$_{1/2}$ or R'$_2$SiO$_{2/2}$, wherein each R' is an alkenyl group, in which some of the$_{1/2}$ siloxane units are of the formula HSiO$_{3/2}$, is treated in solution with a base to condense at least some of the HSiO$_{3/2}$ units to form SiO$_{4/2}$ units. The base is preferably a solution of an alkali metal salt of a weak acid such as a carboxylic acid, for example sodium acetate, sodium hydrogen phosphate or sodium tetraborate. An aqueous and/or organic solvent solution can be used. A preferred solvent mixture comprises water and a dipolar aprotic solvent which is at least partially miscible with water, for example a ketone having 4 to 7 carbon atoms, as described above, or a cyclic ether such as tetrahydrofuran or dioxane. Alternatively the base may comprise an amine, preferably a tertiary amine, particularly a trialkyl amine such as triethylamine or tripropylamine, or alternatively pyridine or dimethylaminopropanol. The base can for example be an aqueous solution of triethylamine. A tertiary amine can act as both base and as a dipolar aprotic solvent, so that one base reagent comprises a solution of an alkali metal salt of a weak acid in a solvent mixture of water and a tertiary amine. The base treatment causes hydrolysis of some of the Si—H groups of the resin to Si—OH groups and subsequent condensation of the Si—OH groups to Si—O—Si linkages, thus converting at least some of the HSiO$_{3/2}$ units to form SiO$_{4/2}$ units.

In an alternative process for preparing a silicone resin according to the invention containing siloxane units of the formula SiO$_{4/2}$, a silicone resin comprising siloxane T units of the formula R"SiO$_{3/2}$ and HSiO$_{3/2}$ is treated in solution with a base to condense at least some of the HSiO$_{3/2}$ units to form SiO$_{4/2}$ units, and the resulting resin solution is reacted with a chlorosilane of the formula R'$_3$SiCl or RR'$_2$SiCl.

The degree of conversion of HSiO$_{3/2}$ units to SiO$_{4/2}$ units can be controlled by controlling the strength and concentration of the base used to treat the resin, the time of contact between the resin and the base and the temperature of the reaction. The base strength and concentration and time and temperature of treatment are preferably sufficient to condense at least 30%, preferably at least 50%, up to 80% or 100%, of the HSiO$_{3/2}$ units to SiO$_{4/2}$ units. The temperature of the reaction with base can for example be in the range 0-140° C. For example, a 0.5M sodium acetate solution in aqueous MIBK will cause 50% conversion of HSiO$_{3/2}$ units to SiO$_{4/2}$ units at 100-110° C. in about 1 hour. A 0.5M solution of sodium acetate in aqueous triethylamine will cause 50% conversion at 25° C. in about 30-40 minutes.

The subsequent reaction of the resulting resin solution with a chlorosilane of the formula R'$_3$SiCl or RR$_2$SiCl converts most of the remaining Si—OH groups to Si—O—SiR'$_3$ groups or Si—O—SiRR'$_2$ groups. The resin solution and chlorosilane are preferably reacted in the presence of a disilazane, which aids in the reaction of Si—OH groups. The disilazane is preferably a disilazane of the formula RR'$_2$Si—NH—SiRR'$_2$, in which the groups R and R' are the same as in the chlorosilane RR'$_2$SiCl, although an alternative disilazane can be used such as tetramethyldisilazane or hexamethyldisilazane. The reaction is preferably carried out under substantially anhydrous conditions in an organic solvent, for example a ketone having 4 to 7 carbon atoms and/or an aromatic hydrocarbon such as toluene or xylene. The reaction can be carried out at a temperature in the range 0-140° C., preferably 20-80° C. The reaction serves to introduce R'$_3$Si— or RR'$_2$Si- groups into the resin and to reduce the level of Si—OH. The starting resin comprising siloxane T units may also comprise siloxane M units of the formula R'$_3$SiO$_{1/2}$ or RR'$_2$SiO$_{1/2}$ since the reaction of the resin solution with chlorosilane and optionally disilazane may not always introduce sufficient R' groups to give the desired level of cure.

The curable resin of the invention can be a self-curable resin which also contains HSiO$_{3/2}$ units and/or HR$_2$SiO$_{1/2}$, H$_2$RSiO$_{1/2}$ or HRSiO$_{2/2}$ units. For example, in a preferred self-curable resin 10 to 50 mol % of the siloxane units of the resin are HSiO$_{3/2}$ units and 5 to 40 mol % of the siloxane units of the resin are of the formula R'$_3$SiO$_{1/2}$ or RR'$_2$SiO$_{1/2}$. Such a self-curable resin can be prepared by any of the processes described above using trichlorosilane HSiCl$_3$ to generate HSiO$_{3/2}$ units. The proportion of HSiCl$_3$ reacted is selected to be sufficient to provide any HSiO$_{3/2}$ units which are required for conversion to SiO$_{4/2}$ units as well as the desired level of HSiO$_{3/2}$ units to form a self-curable resin. A self-curable resin containing HR$_2$SiO$_{1/2}$ units can be prepared by reacting a base hydrolysed resin which comprises siloxane M units of the formula R'$_3$SiO$_{1/2}$ or RR'$_2$SiO$_{1/2}$ with a chlorosilane of the formula HR$_2$SiCl, preferably in the presence of a disilazane such as tetramethyldisilazane. A self-curable silicone resin containing HSiO$_{3/2}$ units and/or HR$_2$SiO$_{1/2}$ units as well as R'$_3$SiO$_{1/2}$ or RR'$_2$SiO$_{1/2}$ units can be cured to a heat resistant silicone resin having a low coefficient of thermal expansion by heating in the presence of a catalyst containing a platinum group metal.

The curable resin generally has a molecular weight of at least 500 up to 300000 or even higher, for example in the range 1000 to 20000. Treatment of the resin with a base to condense HSiO$_{3/2}$ units to form SiO$_{4/2}$ units generally increases the molecular weight of the resin.

The invention includes a curable resin composition comprising a curable silicone resin as defined above and a curing agent having at least one group reactive with the alkenyl group R'. The curing agent preferably contains at least one Si—H group and the curable composition preferably contains a curing catalyst, particularly a catalyst containing a platinum group metal. The curing agent can for example be a polysiloxane containing at least two Si—H groups, such as a polydimethylsiloxane having terminal HZ$_2$Si-groups where each Z is an alkyl group, preferably methyl, or phenyl group, or a further H atom, for example HMe$_2$Si—(O—SiMe$_2$)$_4$—O—SiMe$_2$H, (Me represents methyl) or a polymethylhydrogensiloxane such as 1,3,5,7-tetramethylcyclotetrasiloxane, or a silicone resin containing HZ$_2$Si-groups and T or Q units, for example a low molecular weight MQ resin containing HMe$_2$Si-groups such as (HMe$_2$SiO$_{1/2}$)$_8$(SiO$_{4/2}$)$_8$ or a MT resin such as (HMe$_2$SiO$_{1/2}$)$_3$SiO$_{3/2}$Ph, where PH is phenyl. The curing agent can alternatively be an organic compound containing SiH groups, particularly an aryl compound of the formula HX$_2$Si—Ar—SiX$_2$H, in which Ar is a substantially nonflexible linkage including at least one para-arylene moiety, for example p-phenylene or 4,4'-biphenylene, and each X is a hydrocarbon or substituted hydrocarbon group or a hydrogen atom. The groups HX$_2$Si— can for example be HMe$_2$Si-groups, H$_2$MeSi-groups or H3Si-groups; for example the curing agent can be 1,4-bis(dimethylsilyl)benzene, 1,4-bis(methylsilyl)benzene or 1,4-bis(silyl)benzene.

The curing agent is preferably used in an approximately stoichiometric amount, for example 70 to 150% of stoichiometric, based on the alkenyl groups in the curable silicone resin. The concentration of Si—H groups in the curing agent is preferably such that the curing agent is present at less than 200% by weight, most preferably less than 100% by weight, based on the curable silicone resin. The curable resin composition is generally not based on long chain polydiorganosiloxanes, and preferably less than 40%, most preferably less than 20%, of the silicon atoms in the curable resin composition are present as Me$_2$SiO$_{2/2}$ units or other dialkylsiloxane units.

The curing catalyst is preferably a platinum (±)-1,3-divinyl-1,1,3,3-tetramethyldisiloxane complex which can be used at 20 to 200, for example about 50, parts per million Pt based on the SiH-containing resin (mol/mol). Alternative curing catalysts can be used, for example chloroplatinic acid or an analogous rhodium compound.

The silicone resin composition may additionally contain an inhibitor for the curing reaction, an adhesion promoter that improves unprimed adhesion of the compositions to substrates commonly employed in the construction of electronic devices, and/or one or more fillers or pigments. Examples of inhibitors are 3-methyl-3-penten-1-yne and 3,5-dimethyl-3-hexen-1-yne; acetylenic alcohols such as 3,5-dimethyl-1-hexyn-3-ol, 1-ethynyl-1-cyclohexanol and 2-phenyl-3-butyn-2-ol; maleates and fumarates, such as the well known dialkyl, dialkenyl and dialkoxyalkyl fumarates and maleates; cyclovinylsiloxanes; and benzyl alcohol. Examples of adhesion promoters are an organosilicon compound containing at least one lower alkenyl group or at least one silicon-bonded hydrogen atom and at least one epoxy group, silanes and bis-silylhydrocarbons containing a plurality of silicon-bonded alkoxy groups and at least one vinyl group, an alkenyl isopropenoxysilane or a product of the partial hydrolysis-condensation thereof, or an organosilane containing at least one alkoxy group and at least one epoxy, methacryloxy or acryloxy group. Examples of preferred fillers include fused silica (fused quartz), alumina, boron nitride and aluminium nitride.

The invention includes a process for the preparation of a cured heat resistant silicone resin having a low coefficient of thermal expansion, characterised in that a curable silicone resin as described above is reacted with a curing agent having at least one functional group reactive with the alkenyl group R', preferably a curing agent containing at least one Si—H group. The curing process is preferably carried out in the presence of a catalyst containing a platinum group metal. In an alternative process a self-curable silicone resin as described above is heated in the presence of a catalyst containing a platinum group metal. The curing reaction is generally carried out at a temperature of at least 50° C., preferably at least 100° C., for example in the range 150 to 300° C., particularly 150 to 200° C.

The molecular weight of the curable resin can be controlled so that it is a flowable or a solid resin at room temperature. In a process according to the invention for encapsulating a substrate, the substrate is encapsulated in a curable silicone resin composition according to the invention and the resin is then cured. Such a process can be used for encapsulating delicate substrates, particularly for microelectronic device packaging in processes such as Flip Chip Underfill, No Flow Fluxing Underfill or moulding encapsulation, and may for example replace epoxy or polyimide resins in such applications.

In a process according to the invention for coating a substrate, a curable silicone resin composition according to the invention is applied as a thin film to a substrate before being cured. Such a process can be used in coatings such as wafer level and solar panel coatings, in planarization layers for Flat Panel Displays and in photonic devices. Good quality thin films between 600 nm to 100 μm thick can be produced, as can thick free-standing films several mm. thick.

A curable silicone resin according to the invention can be used to impregnate a fibrous substrate in the production of composites. At least one layer of fibrous material is impregnated with a curable silicone resin composition and the resin is cured as described above, optionally after assembly of several impregnated layers to form a laminate, for example in the production of printed circuit boards.

Cured silicone resins according to the invention are generally heat resistant and have a coefficient of thermal expansion of 120 ppm/° C. or below, for example 30 to 120 ppm/° C. The CTE can be further reduced by the incorporation of a low CTE filler in the resin, for example silica, alumina or mica. The level of filler can for example be up to 1000% by weight based on the silicone resin, preferably at least 5% up to 500%, for example 25 to 80% by weight of the total silicone resin curable composition. The filler is mixed with the curable resin according to the invention before curing. Incorporation of a low CTE filler can reduce the CTE of the filled resin below 50 ppm/° C., even to 10 ppm/° C. or below.

In a preferred process according to the invention, the cured silicone resin is subsequently further heat cured at a temperature in the range 300 to 500° C. The further heat curing at 300-500° C. produces crack-free cured resin exhibiting enhanced thermo-mechanical properties such as higher Young's modulus, even lower CTE, higher plateau modulus (the minimum value of the Young's modulus over a temperature range of −100 to +300° C. including the glass transition temperature Tg, most often within a plateau region at temperatures higher than Tg) and good retention of film quality and strength.

The further heating step at 300-500° C. is preferably carried out in a non-oxidising atmosphere, for example it can be carried out under an inert gas such as nitrogen. Most preferably the further heating step at 300-500° C. is carried out in the presence of an amine which is in the vapour state at the temperature of the further heating step. The amine is preferably a tertiary amine; it can for example be a tertiary amine of the formula NZ$_3$, where each Z represents an alkyl group having 1 to 4 carbon atoms.

The Young's and plateau moduli of the resins of the invention cured at 50 to 300° C. and subsequently further heat cured at a higher temperature in the range 300 to 500° C. are generally above lGpa, for example 1.4 to 3.4 GPa. The fall in modulus from the Young's modulus to the plateau modulus is generally below 20% and may be as low as 3%. Both free-standing films and coatings have high quality and strength.

The invention is illustrated by the following Examples:

EXAMPLE 1

Preparation of $M^{Vi3}_{0.21}T^{Ph}_{0.79}$ Resin 62.5 g (0.29 mol) of phenyltrichlorosilane and 14.3 g (0.10 mol) of trivinylchlorosilane were mixed into 80 ml of MIBK, and added dropwise into a solution consisting of 80 ml of a 1M HCl aqueous solution, 120 ml toluene and 160 ml MIBK at room temperature over a 1 h period. The mixture was then refluxed for another 3 hours under constant stirring. The aqueous layer was poured off and the organic layer was washed four times with water until neutral pH. Removal of residual water by anhydrous $NaSO_4$, and stripping off the solvent led to 53 g of a liquid being highly soluble in common organic solvents. The $M^{Vi3}_{0.21}T^{Ph}_{0.79}$ composition of this resin was determined by $^{29}Si$ and $^{13}C$ NMR spectroscopy (OH wt %=5%).

EXAMPLE 2

Preparation of $M^{Vi3}_{0.23}M^{HMe2}_{0.13}T^{Ph}_{0.64}$ Resin 52 g of $M^{Vi3}_{0.23}T^{Ph}_{0.79}$ prepared according to example 1, were re-dissolved into 70 ml of anhydrous toluene and 10.4 g (72.0 mmol) of trivinylchlorosilane and 9.6 g (72.0 mmol) of 1,1,3,3-tetramethyldisilazane were added. The mixture was stirred at 50° C. for 2 hours. After addition of 150 ml of distilled water, the organic layer was collected and washed four times with water until neutral pH. The mixture was treated by anhydrous $NaSO_4$ to remove residual water by further filtration and volatiles were stripped off leading to 37 g of a straw yellow liquid (2,560 cP neat, or 20 cP with 1,4-bis(dimethylsilyl)benzene cross-linker at 27.4° C.). The $M^{Vi3}_{0.23}M^{HMe2}_{0.13}T^{Ph}_{0.64}$ composition of this resin was determined by $^{29}Si$ and $^{13}C$ NMR spectroscopy (OH wt %<1.5%; Mn=930; Mw=1,309).

EXAMPLE 3

Preparation of $M^{Vi3}_{0.25}T^{H}_{0.75}$ Resin 70.22 g (53.3 mmol) of trichlorosilane and 25.0 g (172.8 mmol) of trivinylchlorosilane were mixed into 120 ml of MIBK, and added dropwise into a solution consisting of 120 ml of a 1 M HCl aqueous solution, 180 ml toluene and 240 ml MIBK at room temperature over a 1 h period. The mixture was then refluxed for another 1.5 hours at 110° C. under constant stirring. The aqueous layer was poured off and the organic layer was washed four times with water until neutral pH. Removal of residual water by anhydrous $NaSO_4$, and stripping off the solvent led to 43 g of a light yellow liquid being highly soluble in common organic solvents. The $M^{Vi3}_{0.25}T^{H}_{0.75}$ composition of this resin was determined by $^{29}Si$ and $^{13}C$ NMR spectroscopy (Mn=5,642; Mw=13,363).

EXAMPLE 4

Preparation of $M^{Vi3}_{0.74}Q_{0.26}$ Resin 30.0 g (207 mmol) of trivinylchlorosilane and 35.2 g (207 mmol) of tetrachlorosilane were mixed into 80 ml of MIBK, and added dropwise into a solution consisting of 80 ml of a 1M HCl aqueous solution, 120 ml toluene and 160 ml MIBK at room temperature over a 1 h period. The mixture was then refluxed for another 3 hours under constant stirring. The aqueous layer was poured off and the organic layer was washed four times with water until neutral pH. Removal of residual water by anhydrous $NaSO_4$, and stripping off the solvent led to 17 g of a liquid being highly soluble in common organic solvents. The $M^{Vi3}_{0.74}Q_{0.26}$ composition of this resin was determined by $^{29}Si$ and $^{13}C$ NMR spectroscopy (OH wt %=1.3%; Mn=1,518; Mw=2,170).

EXAMPLE 5

Preparation of $M^{Vi3}_{0.56}M^{HMe2}_{0.07}Q_{0.37}$ Resin 16 g of $M^{Vi3}_{0.74}Q_{0.26}$ prepared according to example 4, were re-dissolved into 20 ml of anhydrous toluene and 1.84 g (12.7 mmol) of trivinylchlorosilane were added. The mixture was stirred at 50° C. for 30 min. 0.83 g (6.2 mmol) of 1,1,3,3-tetramethyldisilazane was then added in 2 lots at 10 min. interval and the mixture further heated at 50° C. for 90 min. After addition of 50 ml of distilled water, the organic layer was collected and washed four times with water until neutral pH. The mixture was treated by anhydrous $NaSO_4$ to remove residual water by further filtration and volatiles were stripped off leading to 5.3 g of a low viscosity yellow liquid (115 mPa·s at 27.4° C.). The $M^{Vi3}_{0.56}M^{HMe2}_{0.07}Q_{0.37}$ composition of this resin was determined by $^{29}Si$ and $^{13}C$ NMR spectroscopy (OH wt %<0.6%; Mn=2,295; Mw=10,183).

EXAMPLE 6

Preparation of $M^{Vi3}_{0.17}T^{Ph}_{0.30}T^{H}_{0.41}Q_{0.11}$ 75.0 g (355 mmol) of phenyltrichlorosilane, 34.2 g (236 mmol) of trivinylchlorosilane and 80.1 g (591 mmol) of trichlorosilane were mixed into 240 ml of MIBK, and added dropwise into a solution consisting of 240 ml of a 1M HCl aqueous solution, 360 ml toluene and 480 ml MIBK at room temperature over a 1 h period. The mixture was aged for 3 hours at room temperature under constant stirring. The aqueous layer was poured off and the organic layer was washed four times with water until neutral pH. 300 ml of a 1 M aqueous solution of sodium acetate was added into the organic layer and the solution was stirred overnight at 40° C. The aqueous phase was poured off and the organic layer was washed four times with water until neutral pH. The mixture was treated by anhydrous $NaSO_4$ to remove residual water by further centrifugation. The solvents were stripped off leading to 109 g of a liquid resin (4,000 mPa·s at 27.4° C.). The $M^{Vi3}_{0.17}T^{Ph}_{0.30}T^{H}_{0.41}Q_{0.11}$ composition of this resin was determined by $^{29}Si$ and $^{13}C$ NMR spectroscopy (OH wt %=1%; Mn=3,031; Mw=7,652).

EXAMPLE 7

Preparation of $M^{Vi3}_{0.16}M^{HMe2}_{0.05}T^{Ph}_{0.29}T^{H}_{0.35}Q_{0.15}$ Resin 69.6 g of $M^{Vi3}_{0.17}T^{Ph}_{0.30}T^{H}_{0.41}Q_{0.11}$ prepared according to example 6, were re-dissolved into 600 ml of anhydrous toluene and 1.47 g (15.5 mmol) of dimethylchlorosilane and 2.07 g (15.5 mmol) of 1,1,3,3-tetramethyldisilazane were added. The mixture was stirred at room temperature overnight. The mixture was washed four times with water until neutral pH and treated by anhydrous $NaSO_4$ to remove residual water by further centrifugation and filtration. The solvents were stripped off leading to a viscous liquid resin (34,000 cP at 26.9° C.). The $M^{Vi3}_{0.16}M^{HMe2}_{0.05}T^{Ph}_{0.29}T^{H}_{0.35}Q_{0.15}$ composition of this resin was determined by $^{29}Si$ and $^{13}C$ NMR spectroscopy (Mn=2,124; Mw=4,728, OH wt %<0.8%).

EXAMPLE 8

Cure of $M^{Vi3}_{0.21}M^{HMe2}_{0.13}T^{Ph}{0.64}$ with 1,4-bis(dimethylsilyl)benzene To 5.0 g of $M^{Vi3}_{0.21}M^{HMe2}_{0.13}T^{Ph}_{0.64}$ resin (example 2), was added under stirring 2.3 g of 1,4-bis(dimethylsilyl)benzene and 0.5 g of a 10 wt % solution of a platinum (0)-1,3-divinyl-1,1,3,3-tetramethyldisiloxane complex in toluene (Pt°/SiH=50 ppm). The mixture was sonicated for 20 min. and poured into a mould for gradual heating up to 200° C. for 3 h. Large pieces of crack-free specimen were obtained for analysis by dynamic mechanical thermal analysis (DMTA) and thermo-mechanical analysis (TMA).

EXAMPLE 9

Cure of $M^{Vi3}_{0.21}M^{HMe2}_{0.13}T^{Ph}_{0.64}$ with $M^{H}_{3}T^{Ph}$

To 4.0 g of $M^{Vi3}_{0.21}M^{HMe2}_{0.13}T^{Ph}_{0.64}$ resin (example 2), was added under stirring 2.1 g of $MH_3TPh$ and 0.4 g of a 10 wt % solution of a platinum (0)-1,3-divinyl-1,1,3,3-tetramethyl disiloxane complex in toluene (Pt°/SiH=50 ppm). The mixture was sonicated for 15 min. and poured into a mould for gradual heating up to 200° C. for 3 h. The final material was analysed by DMTA and TMA.

EXAMPLE 10

Cure of $M^{Vi3}_{0.25}T^{H}_{0.75}$ with 1,4-bis(dimethylsilyl)benzene

To 7.3 g of $M^{Vi3}_{0.25}T^{H}_{0.75}$ resin (example 3), was added under stirring for 15 min., 7.8 g of 1,4-bis(dimethylsilyl)benzene and 2.7 g of a platinum (0)-1,3-divinyl-1,1,3,3-tetramethyldisiloxane complex in toluene (Pt°/SiH=50 ppm). The mixture was sonicated for 15 min. and poured into a mould for gradual heating up to 200° C. for 3 h. Large pieces of crack-free specimen were obtained for analysis by DMTA and TMA.

EXAMPLE 11

Cure of $M^{Vi3}_{0.56}M^{HMe2}_{0.07}Q_{0.37}$ with 1,4-bis(dimethylsilyl)benzene To 3.0 g of $M^{Vi3}_{0.56}M^{HMe2}_{0.07}Q_{0.37}$ resin (example 5), was added under stirring 5.1 g of 1,4-bis(dimethylsilyl)benzene and 1.3 g of a 10 wt % solution of a platinum (±)-1,3-divinyl-1,1,3,3-tetramethyldisiloxane complex in toluene (Pt°/SiH=50 ppm). The mixture was sonicated for 5 min. and poured into a mould for gradual heating up to 200° C. for 3 h. Large pieces of crack-free specimen were obtained for analysis by DMTA and TMA.

EXAMPLE 12

Cure of $M^{Vi3}_{0.17}T^{Ph}_{0.30}T^{H}_{0.41}Q_{0.11}$ with 1,4-bis(dimethylsilyl)benezene To 3.0 g of $M^{Vi3}_{0.17}T^{Ph}_{0.30}TH_{0.41}Q_{0.11}$ resin (example 5) was added under stirring 1.64 g of 1,4-bis(dimethylsilyl)benzene and 0.38 ml of a platinum (0)-1,3-divinyl-1,1,3,3-tetramethyl disiloxane complex solution in toluene (Pt°/SiH=50 ppm). The mixture was sonicated and poured into a mould for gradual heating up to 200° C. for 3 h. The final material was analysed by DMTA and TMA.

EXAMPLE 13

Self-Addition Cure of $M^{Vi3}_{0.17}T^{Ph}_{0.30}T^{H}_{0.41}Q_{0.11}$ Resin

EXAMPLE 14

Self-Addition Cure of $M^{Vi3}_{0.16}M^{HMe2}_{0.05}T^{Ph}_{0.29}T^{H}_{0.35}Q_{0.15}$ Resin Self-addition curable silicone resins (examples 6 and 7) were subjected to addition cure using a platinum (0)-1,3-divinyl-1,1,3,3-tetramethyldisiloxane complex in toluene as the catalyst. The resin was dissolved in anhydrous toluene and then mixed with a catalytic amount of a platinum (0)-1,3-divinyl-1,1,3,3-tetramethyldisiloxane complex in toluene (Pt°/SiH=50 ppm) for 10 minutes to a 75 wt % solution before casting into a mould. The samples were then heated gradually up to 200° C. for 3 h. Large pieces of crack-free specimen were obtained for analysis by DMTA and TMA.

The cured resins produced by each of Examples 1a to 9a were analysed by DMTA and thermo-mechanical analysis TMA and the results are shown in Table 1, in which $E'_{25}$ is the modulus at 25° C. or Young's modulus and $E'_p$ is the plateau modulus (minimum value of Young's modulus over temperature range −100° C. to +300° C.). The CTE of the cured resins was measured by TMA over various temperature ranges shown in ° C.

TABLE 1

| Entry | $E'_{25}$ (MPa) | $E'_p$ (MPa) | CTE (ppm/K) (temp. range in ° C.) |
|---|---|---|---|
| Example 8 | 2,660 | 590 | 55 (−80/−40), 55 (−30/0), 81(0/70), 97 (80/140), 134 (140/170), 193 (180/200) |
| Example 9 | 1,870 | 680 | 59 (−80/−40), 70 (−30/0), 90 (0/100), 184 (120/160) |
| Example 10 | 2,410 | 1,090 | 65 (−80/−40), 73 (−30/0), 96 (0/70), 122 (80/140), 152 (140/165) |
| Example 11 | 2,600 | 766 | 62 (−80/−40), 75 (−30/0), 87 (0/70), 106 (70/140), 144 (140/170), 127 (210/240) |
| Example 12 | 2,380 | 960 | 7 (−80/0), 30 (20/60), 70 (70/100), 154 (135/160) |
| Example 13 | 1,700 | 1060 | 71 (−80/−40), 85 (−30/0), 103 (0/70), 96 (80/150), 112 (160/190) |
| Example 14 | 1,920 | 1,150 | 73 (−80/−40), 84 (−30/0), 107 (0/45), 183 (130/170), 130 (170/195) |

EXAMPLES 15 TO 17

Thermal Post-Cure

Free-standing resin films produced according to Examples 12 to 14 were subjected to an annealing treatment. The addition-cured free-standing resin film was placed into the chamber of a furnace. The chamber was purged by 3 vacuum/$N_2$ cycles. The samples were then heated under $N_2$ gradually up to 400° C. The $N_2$ inlet was then bubbling into a triethylamine solution and the samples were further heated at 400° C. for 2 hours under a N2/triethylamine vapour atmosphere. Crack-free specimen were obtained for analysis by DMTA and TMA (Table 2).

TABLE 2

| Entry | Cured resin of Example No. | $E'_{25}$ (MPa) | $E'_p$ (MPa) | CTE (ppm/° K.) (temp. range in ° C.) |
|---|---|---|---|---|
| Example 15 | 12 | 2900 | 2190 | 49 (−80/−40), 65 (−30/0), 66 (0/70), 86 (80/140), 93 (140/170) |
| Example 16 | 13 | 3470 | 3380 | 50 (−80/−40), 53 (−30/0), 54 (0/70), 55 (80/140), 65 (140/165) |
| Example 17 | 14 | 2890 | 2750 | 23 (−80/−40), 32 (−30/0), 38 (0/70), 51 (80/140), 60 (140/170) |

As can be seen from Table 2, the cured resins produced by post-curing at 400° C. had very high Young's modulus, very low CTE and showed a particularly high plateau modulus (negligible decrease in modulus at higher temperature).

The invention claimed is:

1. A curable silicone resin having the empirical formula $$(R_3SiO_{1/2})_a(R_2SiO_{2/2})_b(RSiO_{3/2})_c(SiO_{4/2})_d$$

wherein each R is a hydrocarbon or a hydrogen atom; and a=0.02 to 0.8; b=0 to 0.4; and c+d=0.2 to 0.98, where a+b+c+d=1.0, and where the resin has at least 2 mole % siloxane units of the formula $R'_3SiO_{1/2}$, $RR'_2SiO_{1/2}$ or $R'_2SiO_{2/2}$, wherein each R' is an alkenyl group.

2. A curable silicone resin according to claim 1, wherein each R' is a vinyl group.

3. A curable silicone resin according to claim 1, wherein at least 10 mole % of the siloxane units of the resin are $Vi_3SiO_{1/2}$ groups, where Vi represents vinyl.

4. A curable silicone resin according to claim 1, wherein at least 80 mole % of the siloxane units of the resin are selected from $R'_3SiO_{1/2}$, $RSiO_{3/2}$ and $SiO_{4/2}$ units.

5. A curable silicone resin according to claim 1, wherein at least 20 mole % of the siloxane units of the resin are $ArSiO_{3/2}$ units where Ar represents an aryl group.

6. A curable silicone resin according to claim 1, wherein 10-50 mole % of the siloxane units of the resin are $HSiO_{3/2}$ units.

7. A curable silicone resin according to claim 1, wherein 10-50 mole % of the siloxane units of the resin are $HR_2SiO_{1/2}$, $H_2RSiO_{1/2}$ or $HRSiO_{2/2}$ units.

8. A curable resin composition comprising (I) a curable silicone resin having the empirical formula $$(R_3SiO_{1/2})_a(R_2SiO_{2/2})_b(RSiO_{3/2})_c(SiO_{4/2})_d$$

wherein each R is a hydrocarbon or a hydrogen atom; and a=0.02 to 0.8; b=0 to 0.4; and c+d=0.2 to 0.98, where a+b+c+d=1.0, where at least 2 mole % of the resin are siloxane units of the formula $R'_3SiO_{1/2}$, $RR'SiO_{1/2}$ or $R'_2SiO_{2/2}$, wherein each R' is an alkenyl group, and (II) a curing agent having at least one group reactive with the alkenyl group R'.

9. A curable resin composition according to claim 8 wherein the curing agent contains at least one Si—H group and the composition includes a catalyst containing a platinum group metal.

10. A curable resin composition according to claim 9 wherein the curing agent is a polysiloxane containing at least two Si—H groups or an aryl compound of the formula $HX_2Si—Ar—SiX_2H$, in which Ar is a substantially nonflexible linkage including at least one para-arylene moiety and each X is a hydrocarbon or substituted hydrocarbon group or a hydrogen atom.

11. A curable resin composition comprising a curable resin according to claim 6 and a catalyst containing a platinum group metal.

12. A process for the preparation of a cured heat resistant silicone resin, comprising the step of reacting a curable silicone resin having the empirical formula $$(R_3SiO_{1/2})_a(R_2SiO_{2/2})_b(RSiO_{3/2})_c(SiO_{4/2})_d$$

wherein each R is a hydrocarbon or a hydrogen atom; and a=0.02 to 0.8; b=0 to 0.4; and c+d=0.2 to 0.98, where a+b+c+d=1.0, where at least 2 mole % of the resin are siloxane units of the formula $R'_3SiO_{1/2}$, $RR'_2SiO_{1/2}$ or $R'_2SiO_{2/2}$, wherein each R' is an alkenyl group, with a curing agent having at least one functional group reactive with the alkenyl group R'.

13. A process according to claim 12, wherein the curing agent contains at least one Si—H group and the curing process is carried out in the presence of a catalyst containing a platinum group metal.

14. A process for the preparation of a cured heat resistant silicone resin, comprising the step of heating a curable silicone resin according to claim 6 in the presence of a catalyst containing a platinum group metal.

15. A process for encapsulating a substrate comprising the steps of coating the substrate with a curable silicone resin composition comprising (I) a curable silicone resin having the empirical formula $$(R_3SiO_{1/2})_a(R_2SiO_{2/2})_b(RSiO_{3/2})_c(SiO_{4/2})_d$$

wherein each R is a hydrocarbon or a hydrogen atom; and a=0.02 to 0.8; b=0 to 0.4; and c+d=0.2 to 0.98, where a+b+c+d=1.0, where at least 2 mole % of the resin are siloxane units of the formula $R'_3SiO_{1/2}$, $RR'_2SiO_{1/2}$ or $R'_2SiO_{2/2}$, wherein each R' is an alkenyl group, and (II) a curing agent having at least one group reactive with the alkenyl group R', and then reacting (I) and (II).

16. A process for coating a substrate comprising the steps of applying a curable silicone composition comprising (I) a curable silicone resin having the empirical formula $$(R_3SiO_{1/2})_a(R_2SiO_{2/2})_b(RSiO_{3/2})_c(SiO_{4/2})_d$$

wherein each R is a hydrocarbon or a hydrogen atom; and a=0.02 to 0.8; b=0 to 0.4; and c+d=0.2 to 0.98, where a+b+c+d=1.0, where at least 2 mole % of the resin are siloxane units of the formula $R'_3SiO_{1/2}$, $RR'_2SiO_{1/2}$ or $R'_2SiO_{2/2}$, wherein each R' is an alkenyl group, and (II) a curing agent having at least one group reactive with the alkenyl group R' as a thin film to a substrate and then reacting (I) and (II).

17. A process for making a composite material, comprising the step of impregnating at least one layer of fibrous material with a curable silicone composition comprising (I) a curable silicone resin having the empirical formula $$(R_3SiO_{1/2})_a(R_2SiO_{2/2})_b(RSiO_{3/2})_c(SiO_{4/2})_d$$

wherein each R is a hydrocarbon or a hydrogen atom; and a=0.02 to 0.8; b=0 to 0.4; and c+d=0.2 to 0.98, where a+b+c+d=1.0, where at least 2 mole % of the resin are siloxane units of the formula $R'_3SiO_{1/2}$, $RR'_2SiO_{1/2}$ or $R'_2SiO_{2/2}$, wherein each R' is an alkenyl group, and (II) a curing agent having at least one group reactive with the alkenyl group R' and then reacting (I) and (II).

18. A process according to claim 12, wherein the step of reacting a curable silicone resin with a curing agent is at a temperature in the range 50 to 300° C. and further comprising a subsequent heat cure step at a temperature in the range 300 to 500° C.

19. A process according to claim 18, wherein the further heating step at 300-500° C. is carried out in the presence of an amine which is in the vapour state at the temperature of the further heating step.

20. A process according to claim 19, wherein the amine is a tertiary amine of the formula $NZ_3$, where each Z represents an alkyl group having 1 to 4 carbon atoms.

21. A cured heat resistant silicone resin prepared by the process of claim 12.

22. A cured heat resistant silicone resin prepared by the process of claim 18.

* * * * *